United States Patent [19]

Babb

[11] Patent Number: 5,050,594
[45] Date of Patent: Sep. 24, 1991

[54] ADJUSTABLE RESPIRATOR MASK APPARATUS

[76] Inventor: Lynn D. Babb, 7227 SW. 22nd Pl., Gainesville, Fla. 32607

[21] Appl. No.: 597,501

[22] Filed: Oct. 15, 1990

[51] Int. Cl.$^5$ .............................................. A62B 18/08
[52] U.S. Cl. ............................ 128/206.24; 128/206.26
[58] Field of Search ...................... 128/206.24, 206.25, 128/206.26, 206.28, 206.21, 205.25

[56] References Cited

U.S. PATENT DOCUMENTS

| | | | |
|---|---|---|---|
| 1,960,544 | 5/1934 | Malcom | 128/206.26 |
| 2,706,983 | 4/1955 | Matheson et al. | 128/206.24 |
| 3,545,436 | 12/1970 | Holloway | 128/206.24 |
| 3,556,097 | 1/1971 | Wallace | 128/206.24 |
| 4,392,490 | 7/1983 | Mattingly et al. | 128/205.25 |
| 4,440,163 | 4/1984 | Spergel | 128/205.25 |
| 4,669,462 | 6/1987 | Marshall | 128/205.25 |

FOREIGN PATENT DOCUMENTS 303090 2/1989 European Pat. Off. ........ 128/205.25
2154145 9/1985 United Kingdom ........... 128/205.25

Primary Examiner—Edgar S. Burr
Assistant Examiner—Stephen R. Funk
Attorney, Agent, or Firm—Leon Gilden

[57] ABSTRACT

Apparatus setting forth a respirator mask to permit accommodation of facial irregularities and variations among individuals wherein the mask construction includes a flexible and encircling face ring including a pleated accordion ring member extendable and retractable relative to the ring in a coextensive surrounding relationship relative to the ring forwardly thereof wherein the pleated accordion ring includes multi-segmented portions formed with reinforcing encircling ring wires as well as spaced parallel reinforcing strips wherein the reinforcing strips generally of a metallic configuration stabilized repositioning of an associated forward upper shield relative to the ring wherein the upper shield is positioned overlying a lower planar shield to position a flexible pleated hose relative to individual's mouth utilizing the mask.

6 Claims, 4 Drawing Sheets

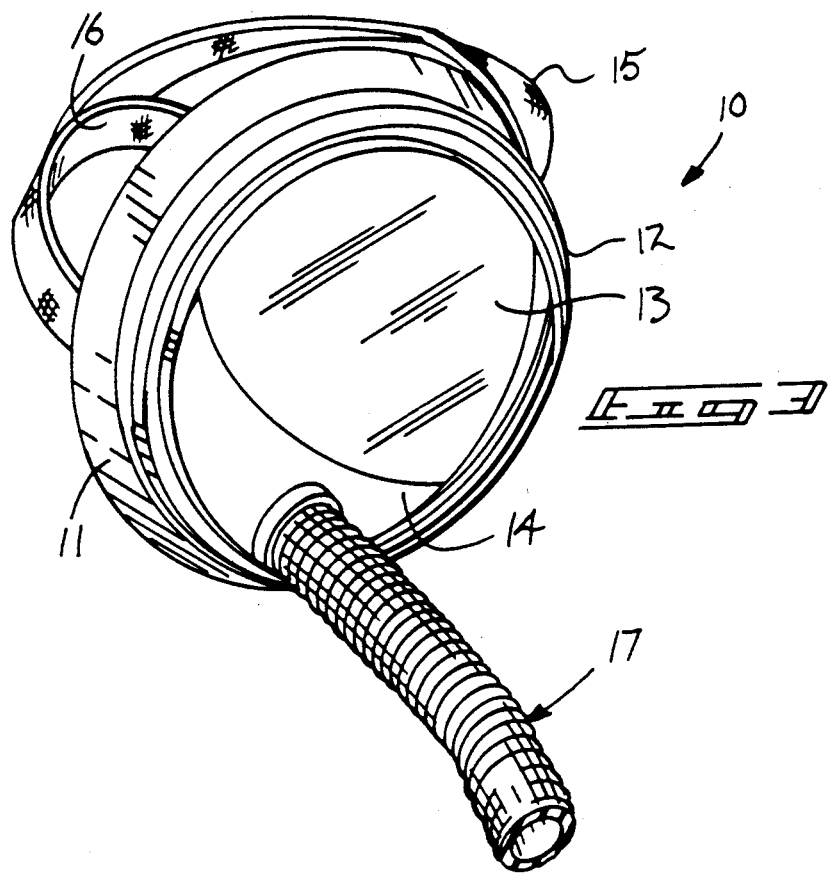
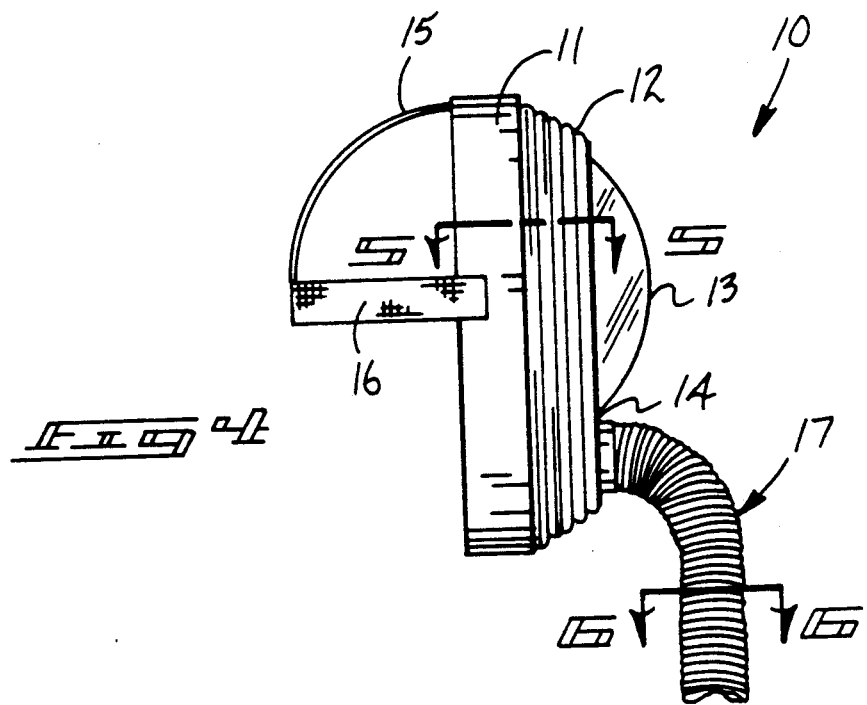

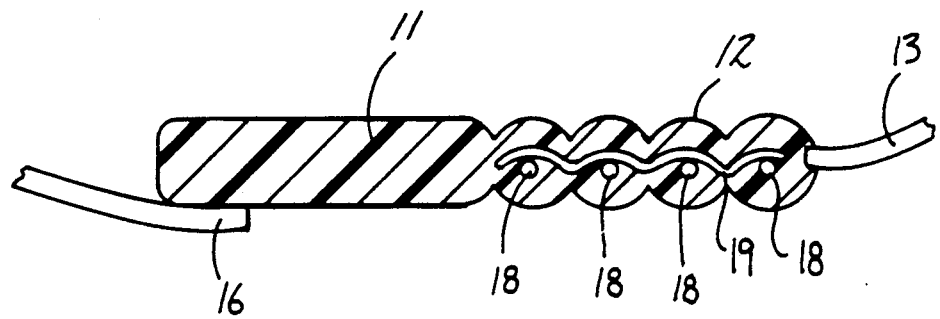
Fig 5
Fig 6
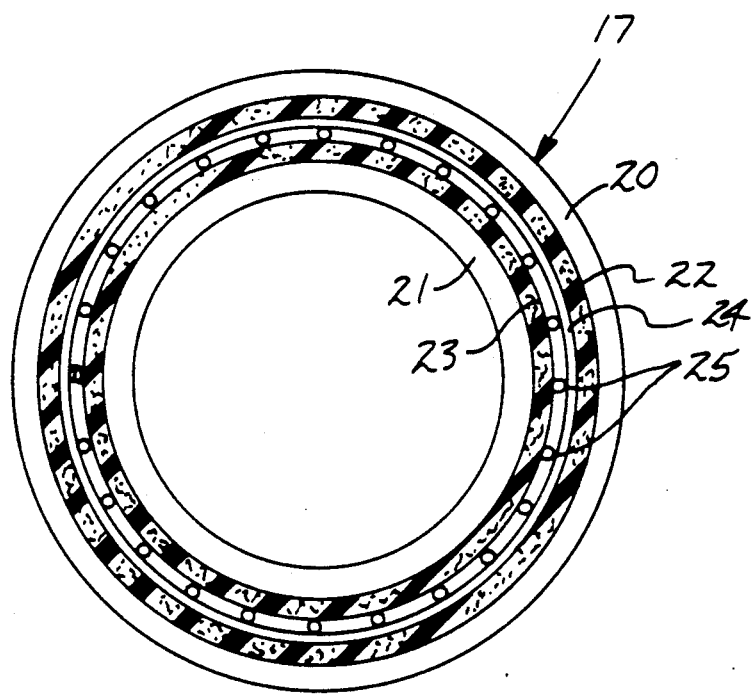

ADJUSTABLE RESPIRATOR MASK APPARATUS

BACKGROUND OF THE INVENTION

1. Field of the Invention

The field of the invention relates to respirator mask apparatus, and more particularly pertains to a new and improved adjustable respirator mask apparatus wherein the same accommodates various facial configurations relative to individuals.

2. Description of the Prior Art

Respirator mask structure of the prior art sets forth an organization typically of a predetermined and set geometric configuration. Among individuals however, various facial variations such as enlarged features or misshapen figures due to a variety of occurrences such as accidents, genetic predisposition, and the like effects in prior art respirator mask structure being uncomfortable and non-accommodating. The instant invention attempts to overcome deficiencies of the prior art by providing a respirator mask structure permitting accommodation of a variety of facial differences among individuals. Prior art structure that is available is typified by U.S. Pat. No. 4,440,163 to SPERGEL wherein a mask structure utilizes a concave face shield to receive an individual's face therewithin with a single ring accommodating the mask to an individual's face.

U.S. Pat. No. 4,669,462 to MARSHALL sets forth a respirator wherein an elongate truncated coil like tube is mounted to a face shield that in turn is mounted to a single ring encompassing an individual's face in use.

U.S. Pat. No. 4,702,243 to SMITH sets forth a respirator mask utilizing a resilient encircling ring like member mounted to a face of a wearer thereof.

U.S. Pat. No. 4,392,490 to MATTINGLY et al sets forth a plural outlet breathing apparatus wherein the apparatus includes a plurality of masks each of a single ring construction to accommodate an individual's face in a sealing relationship thereabout.

As such, it may be appreciated that there continues to be a need for a new and improved adjustable respirator mask apparatus as set forth by the instant invention which addresses both the problems of ease of use as well as effectiveness in construction in accommodating various facial variations among individuals and in this respect, the instant invention substantially fulfills this need.

SUMMARY OF THE INVENTION

In view of the foregoing disadvantages inherent in the known types of respirator mask apparatus present in the prior art, the present invention provides a new and improved adjustable respirator mask apparatus wherein the same utilizes a flexible ring as well as a pleated accordion extension ring coextensive with the flexible ring to accommodate various facial configurations among individuals. As such, the general purpose of the present invention, which will be described subsequently in greater detail, is to provide a new and improved adjustable respirator mask apparatus which has all the advantages of the prior art respirator mask apparatus and none of the disadvantages.

To attain this, the adjustable respirator mask apparatus of the invention includes apparatus setting forth a respirator mask to permit accommodation of facial irregularities and variations among individuals wherein the mask construction includes a flexible and encircling face ring including a pleated accordion ring member extendable and retractable relative to the ring in a coextensive surrounding relationship relative to the ring forwardly thereof wherein the pleated accordion ring includes multi-segmented portions formed with reinforcing encircling ring wires as well as spaced parallel reinforcing strips wherein the reinforcing strips generally of a metallic configuration stabilize repositioning of an associated forward upper shield relative to the ring wherein the upper shield is positioned overlying a lower planar shield to position a flexible pleated hose relative to individual's mouth utilizing the mask. The hose construction includes an outer flexible skin concentric with an inner flexible skin wherein an inner and outer polymeric liner coextensively directed throughout the hose secure longitudinal and coaxially parallel reinforcing wires as well as orthogonally oriented reinforcing rings arranged relative to the wires to effect geometric stability in contouring of the flexible hose as required. A modification of the invention includes a pneumatic chamber formed within the face ring to enhance sealing of the face ring relative to an individual.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable respirator mask apparatus which has all the advantages of the prior art respirator mask apparatus and none of the disadvantages.

It is another object of the present invention to provide a new and improved adjustable respirator mask apparatus which may be easily and efficiently manufactured and marketed.

It is a further object of the present invention to provide a new and improved adjustable respirator mask apparatus which is of a durable and reliable construction.

An even further object of the present invention is to provide a new and improved adjustable respirator mask apparatus which is susceptible of a low cost of manufacture with regard to both materials and labor, and which accordingly is then susceptible of low prices of sale to the consuming public, thereby making such adjustable respirator mask apparatus economically available to the buying public.

Still yet another object of the present invention is to provide a new and improved adjustable respirator mask apparatus which provides in the apparatuses and methods of the prior art some of the advantages thereof, while simultaneously overcoming some of the disadvantages normally associated therewith.

Still another object of the present invention is to provide a new and improved adjustable respirator mask apparatus which may be compactly stored when not being utilized.

Yet another object of the present invention is to provide a new and improved adjustable respirator mask apparatus wherein the same permits accommodation of various facial variations among individuals.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic side view taken in elevation of the instant invention.

FIG. 5 is an orthographic view taken along the lines 5—5 of FIG. 4 in the direction indicated by the arrows.

FIG. 6 is an orthographic view taken along the lines 6—6 of FIG. 4 in the direction indicated by the arrows.

DESCRIPTION OF THE PREFERRED EMBODIMENT

Figure 1:
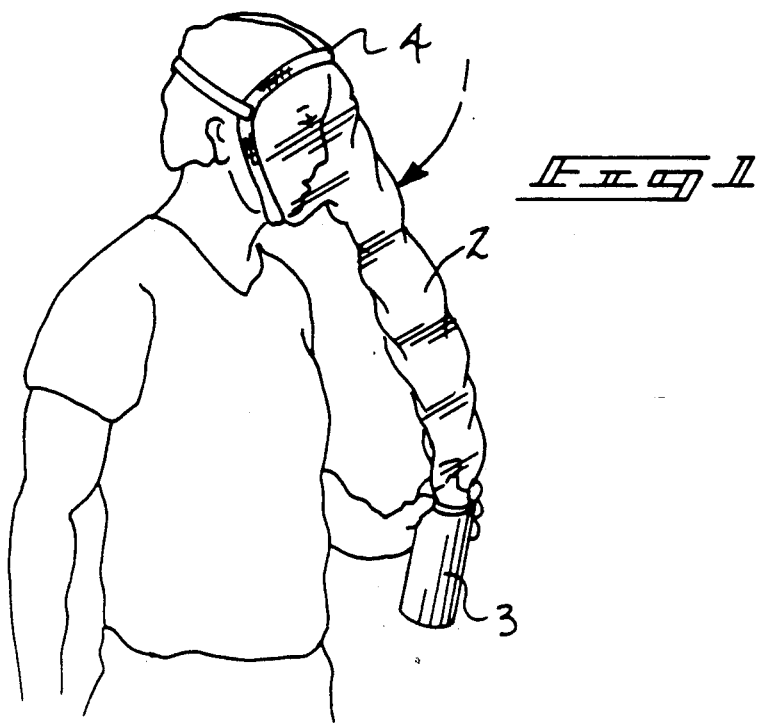
FIG. 1 is an isometric illustration of a prior art respirator mask apparatus.

With reference now to the drawings, and in particular to FIGS. 1 to 8 thereof, a new and improved adjustable respirator mask apparatus embodying the principles and concepts of the present invention and generally designated by the reference numeral 10 will be described.

Figure 2:
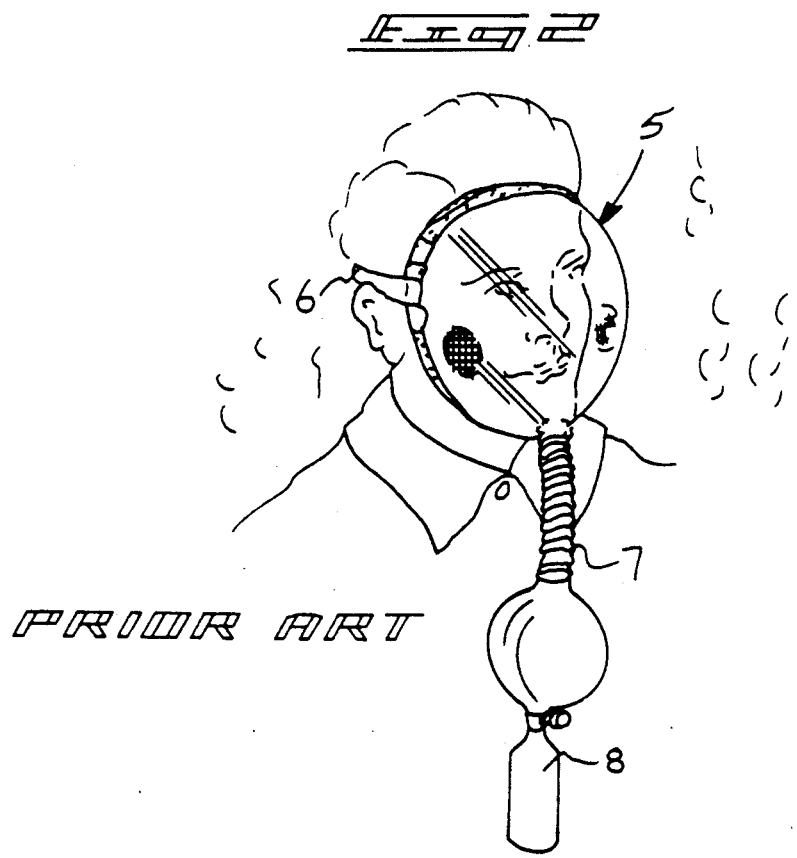
FIG. 2 is an isometric illustration of a further prior art respirator mask apparatus.

FIG. 1 sets forth a prior art mask structure 1 wherein elongate truncated tube member 2 extends from air supply reservoir 3 rearwardly to a single ring facial structure 4 to secure the mask to an individual. FIG. 2 in a similar manner sets forth a prior art mask structure 5 wherein a single deformable ring includes strap structures 6 to secure the ring to an individual's face wherein in the single concave shield is in pneumatic association with the reservoir 8 through a flexible tube 7.

More specifically, the adjustable respirator mask apparatus of the instant invention essentially comprises an encircling face ring formed of a flexible facial accommodating material such as polymerics and the like wherein a pleated accordion ring 12 is extensible relative to the face ring where the accordion ring 12 is formed of a plurality of segments in a manner as illustrated in FIG. 5 for example that permit extension of the accordion ring. A projecting concave upper shield 13 is mounted to overlie the accordion ring 12 with a rigid relatively planar lower shield 14 arranged to underlie the upper shield 13 and positionable to space the lower shield 14 in a relatively close relationship to an individual's mouth to position an associated air supply (not shown) of conventional construction utilizing a reservoir or the like in a manner as is set forth in FIGS. 1 and 2 for example in the prior art. A quarter cylindrical band 15 is directed from an upper position of the face ring 11 rearwardly thereof and fixedly mounted to a semi-cylindrical lateral band 16 that is mounted to opposed side portions of the ring 11. It is understood that a partial facial mask, covering the nose and mouth portions of an individual may be utilized as required.

Reference to FIG. 5 illustrates a cross-sectional construction of the mask organization wherein the pleated accordion ring 12 includes spaced parallel encircling mask reinforcing wire rings 18 to impart geometric integrity to the accordion ring structure with spaced parallel reinforcing strips 19 directed orthogonally relative to the mask reinforcing rings 18 to maintain the accordion ring structure in an extended or retracted position and thereby stabilize a geometric configuration imparted to the accordion ring structure.

The flexible pleated hose 17 includes an outer flexible skin 20 coaxial to an inner flexible skin 21 wherein an outer polymeric liner 22 and an inner polymeric liner 23 formed integrally with the outer and inner flexible skin encompass spaced hose reinforcing rings 24 that are arranged parallel with the longitudinal extent of the flexible hose 17 with longitudinal spaced reinforcing wires 25 to maintain geometric integrity and configuration imparted to the hose and thereby position an associated reservoir in a fixed relationship relative to the mask structure.

Figure 7:
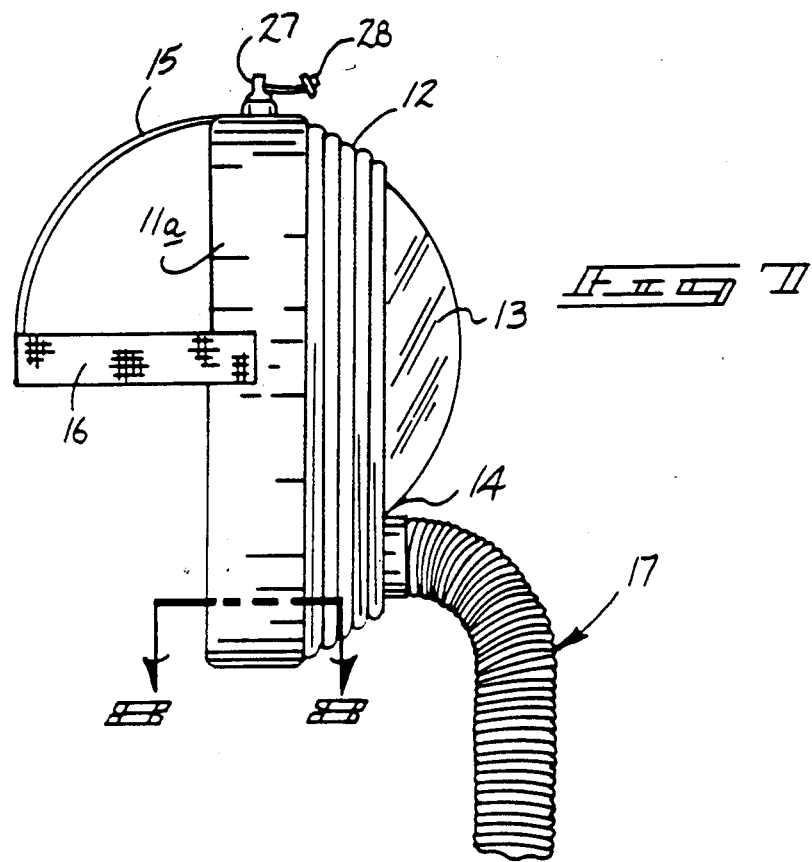
FIG. 7 is an orthographic side view taken in elevation of a modified mask structure of the instant invention.
Figure 8:
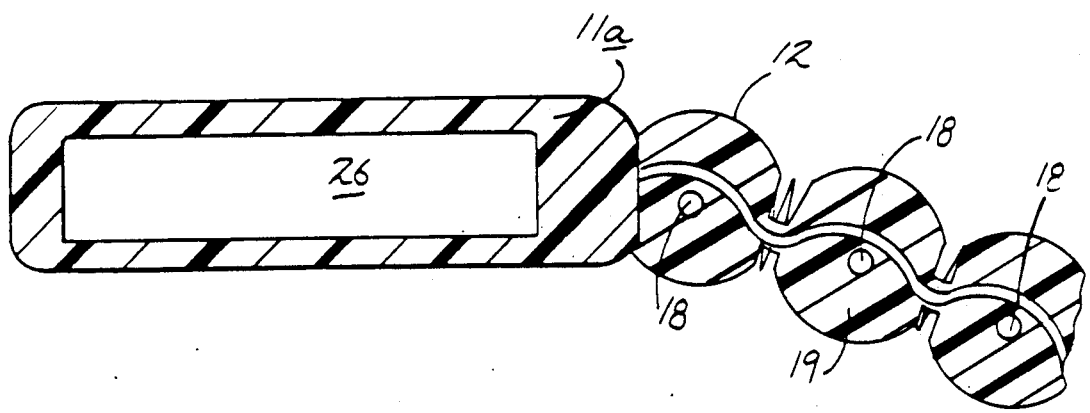
FIG. 8 is an orthographic view taken along the lines 8—8 of FIG. 7 in the direction indicated by the arrows.

FIG. 7 and 8 illustrate a modified face ring structure 11 to cooperate with the pleated accordion ring 12 wherein the face ring includes an encircling pneumatic inflation chamber 26 defining a cavity to surround the face ring 11 that is in pneumatic communication with an inflation valve 27 that is provided with an inflation valve cap 28 whereupon manual mechanical pressurization of the inflation chamber 26 is available to enhance sealing engagement of the modified face ring 11a relative to an individual.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable respirator mask apparatus comprising in combination,
    a flexible facial accommodating face ring, the face ring including a forward edge spaced from a rear edge, and the face ring including an adjustment ring coextensively mounted to the forward edge of the face ring, and
    a shield means mounted overlying the adjustment ring to enclose an individual's face mounted within the face ring, and
    a flexible hose in fluid communication with the shield means, and
    a securement means mounted to the face ring spaced from the adjustment ring to secure the face ring to an individual's head, and
    wherein the adjustment ring is defined by an accordion ring, the accordion ring including a series of segments to permit extension of the accordion ring relative to the face ring, and
    wherein the accordion ring further includes a series of spaced parallel encircling reinforcing wire rings where at least one wire ring is directed through each of the segments.

2. Apparatus as set forth in claim 1 wherein the adjustment ring further includes a plurality of parallel reinforcing strips directed orthogonally relative to the encircling reinforcing wire rings to maintain geometric integrity to the accordion ring in an extended or retracted orientation.

3. Apparatus as set forth in claim 2 wherein the hose includes an outer flexible skin coaxially arranged relative to an inner flexible skin with an outer polymeric liner mounted adjacent an interior surface of the outer flexible skin with an inner polymeric liner mounted adjacent an inner surface of the inner flexible skin with a series of spaced hose reinforcing rings directed throughout a longitudinal extent defined by the hose.

4. Apparatus as set forth in claim 3 wherein the hose further includes longitudinal reinforcing wires directed orthogonally relative to the spaced hose reinforcing rings to maintain geometric configuration imparted to the hose.

5. Apparatus as set forth in claim 4 wherein the outer flexible skin, the inner flexible skin, the outer polymeric liner, and the inner polymeric liner of the hose are coaxially arranged throughout the hose relative to one another with the hose reinforcing rings and the spaced reinforcing wires captured between the outer polymeric liner and the inner polymeric liner.

6. Apparatus as set forth in claim 5 wherein the face ring includes an encircling pneumatic inflation chamber in pneumatic communication with an inflation valve mounted through the face ring to permit selective inflation of the inflation chamber to enhance sealing of the inflation chamber relative to the individual.

* * * * *